United States Patent
Aoki et al.

(10) Patent No.: US 9,764,276 B2
(45) Date of Patent: Sep. 19, 2017

(54) RESIN COMPOSITION AND CARBON DIOXIDE GAS SEPARATION MEMBRANE

(71) Applicant: SUMITOMO CHEMICAL COMPANY, LIMITED, Tokyo (JP)

(72) Inventors: Ayumi Aoki, Tsukuba (JP); Mitsunori Nodono, Tsukuba (JP); Kentaro Masui, Tsukuba (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 14/903,693

(22) PCT Filed: Jul. 9, 2014

(86) PCT No.: PCT/JP2014/068845
§ 371 (c)(1),
(2) Date: Jan. 8, 2016

(87) PCT Pub. No.: WO2015/005495
PCT Pub. Date: Jan. 15, 2015

(65) Prior Publication Data
US 2016/0158692 A1 Jun. 9, 2016

(30) Foreign Application Priority Data
Jul. 11, 2013 (JP) ................................. 2013-145181

(51) Int. Cl.
*B01D 53/22* (2006.01)
*C08K 3/26* (2006.01)
*C08L 65/00* (2006.01)
*C08G 61/10* (2006.01)

(52) U.S. Cl.
CPC ........... *B01D 53/228* (2013.01); *C08G 61/10* (2013.01); *C08K 3/26* (2013.01); *C08L 65/00* (2013.01); *B01D 2257/504* (2013.01); *C08G 2261/1452* (2013.01); *C08G 2261/312* (2013.01); *C08G 2261/3444* (2013.01); *C08G 2261/516* (2013.01); *C08K 2003/262* (2013.01); *Y02C 10/04* (2013.01); *Y02C 10/10* (2013.01); *Y02P 20/152* (2015.11)

(58) Field of Classification Search
CPC .. B01D 53/228; B01D 2257/504; C08K 3/26; C08L 65/00; C08G 61/10; C08G 2261/1452; C08G 2261/312; C08G 2261/3444; C08G 2261/576; Y02P 20/152; Y02C 10/04; Y02C 10/10
USPC .......................................................... 521/27
See application file for complete search history.

(56) References Cited

U.S. PATENT DOCUMENTS

| | | | | |
|---|---|---|---|---|
| 3,780,496 | A * | 12/1973 | Ward, III | B01D 53/228 95/53 |
| 5,445,669 | A * | 8/1995 | Nakabayashi | B01D 53/228 423/226 |
| 6,419,725 | B1 * | 7/2002 | Laverty | B01D 71/52 55/524 |
| 2009/0253015 | A1 | 10/2009 | Onodera et al. | |
| 2010/0167165 | A1 * | 7/2010 | Masui | C08G 75/23 429/492 |
| 2012/0251919 | A1 | 10/2012 | Nakamura et al. | |
| 2012/0297976 | A1 | 11/2012 | Sano | |
| 2013/0014642 | A1 | 1/2013 | Sano | |
| 2015/0283518 | A1 | 10/2015 | Hirose et al. | |
| 2016/0051938 | A1 | 2/2016 | Okada et al. | |

FOREIGN PATENT DOCUMENTS

| | | | | |
|---|---|---|---|---|
| JP | 07112122 | A * | 10/1993 | ............. B01D 53/22 |
| JP | 07-112122 | A | 5/1995 | |
| JP | 09-110982 | A | 4/1997 | |
| JP | 2002-503543 | A | 2/2002 | |
| JP | 2002503543 | A * | 5/2002 | ............. B01D 53/22 |
| JP | WO 2007072978 | A1 * | 6/2007 | ......... B01D 67/0006 |
| JP | 2007-177197 | A | 7/2007 | |
| JP | 2007-297605 | A | 11/2007 | |
| JP | 2009-082850 | A | 4/2009 | |
| JP | 2010-116503 | A | 5/2010 | |
| JP | 2010116503 | A * | 5/2010 | |
| JP | 2011-102388 | A | 5/2011 | |
| JP | 2011161387 | A | 8/2011 | |
| WO | 2007/072978 | A1 | 6/2007 | |
| WO | 2009044588 | A1 | 4/2009 | |
| WO | 2011/122581 | A1 | 10/2011 | |
| WO | 2014/065387 | A1 | 5/2014 | |
| WO | 2014/157069 | A1 | 10/2014 | |

OTHER PUBLICATIONS

Israel Cabasso et al., "Synthesis and Characterization of Polymers with Pendent Phosphonate Groups," Journal of Applied Polymer Science, 1974, pp. 1969-1986, vol. 18.
International Search Report of PCT/JP2014/068845 dated Sep. 9, 2014.
Communication dated Feb. 27, 2017, from the European Patent Office in counterpart European application No. 14823477.6.
Communication dated May 9, 2017, from the Japanese Patent Office in counterpart application No. 2013-145181.

* cited by examiner

Primary Examiner — Michael M Bernshteyn
(74) Attorney, Agent, or Firm — Sughrue Mion, PLLC

(57) ABSTRACT

The present invention relates to a resin composition including a substance capable of reacting reversibly with a carbon dioxide gas, and a hydrocarbon-based polymer; a carbon dioxide gas separation membrane obtained from the resin composition; a carbon dioxide gas separation membrane module including the separation membrane; and a carbon dioxide gas separation apparatus including at least one type of the module.

8 Claims, No Drawings

RESIN COMPOSITION AND CARBON DIOXIDE GAS SEPARATION MEMBRANE

CROSS REFERENCE TO RELATED APPLICATIONS

This is a National Stage of International Application No. PCT/JP2014/068845 filed Jul. 9, 2014, claiming priority based on Japanese Patent Application No. 2013-145181 filed Jul. 11, 2013, the contents of all of which are incorporated herein by reference in their entirety.

TECHNICAL FIELD

The present invention relates to a resin composition useful for preparation of a separation membrane for separating a carbon dioxide gas from a raw gas containing a carbon dioxide gas; a carbon dioxide gas separation membrane obtained from the resin composition; a carbon dioxide gas separation membrane module including the separation membrane; and a carbon dioxide gas separation apparatus including at least one type of the module.

BACKGROUND ART

Patent Literature 1 describes the use of a vinyl alcohol-acrylic acid sodium salt copolymer as a resin useful for preparation of a separation membrane for separating a carbon dioxide gas from a raw gas containing a carbon dioxide gas.

CITATION LIST

Patent Document

Patent Literature 1: Japanese Patent Laying-Open No. 7-112122

However, a carbon dioxide gas separation membrane obtained using the copolymer does not necessarily have satisfactory carbon dioxide gas permeance and durability.

The present invention includes inventions as described in [1] to [9] below.

[1] A resin composition including: a substance capable of reacting reversibly with a carbon dioxide gas; and a hydrocarbon-based polymer containing a structural unit represented by the following formula (I):

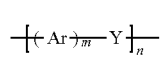
(I)

wherein Ar represents an arylene group forming a main chain; the arylene group has at least one directly or indirectly bonded ion-exchange group, and optionally has at least one group selected from the group consisting of a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group; m represents an integer greater than or equal to 1; n represents an integer greater than or equal to 2; a plurality of occurrences of Ar may be the same, or different; Y represents a direct bond, $SO_2$, CO or O; and a plurality of occurrences of Y may be the same, or different.

[2] The resin composition according to [1], wherein the substance capable of reacting reversibly with a carbon dioxide gas is an alkali metal carbonate, an alkali metal hydrogen carbonate or an alkali metal hydroxide.

[3] The resin composition according to [1], wherein the substance capable of reacting reversibly with a carbon dioxide gas is an alkali metal carbonate or an alkali metal hydrogen carbonate.

[4] The resin composition according to [1], wherein the substance capable of reacting reversibly with a carbon dioxide gas is cesium carbonate, cesium hydrogen carbonate, rubidium carbonate or rubidium hydrogen carbonate.

[5] The resin composition according to [1], wherein the substance capable of reacting reversibly with a carbon dioxide gas is cesium carbonate.

[6] The resin composition according to any one of [1] to [5], wherein the content of the substance capable of reacting reversibly with a carbon dioxide gas is in the range of 20% by weight to 90% by weight based on the total weight of the substance capable of reacting reversibly with a carbon dioxide gas and the hydrocarbon-based polymer containing a structural unit represented by the formula (I).

[7] A carbon dioxide gas separation membrane including the resin composition according to any one of [1] to [6], and a porous membrane.

[8] A carbon dioxide gas separation membrane module including the carbon dioxide gas separation membrane according to [7].

[9] A carbon dioxide gas separation apparatus including at least one type of the carbon dioxide gas separation membrane module according to [8].

Use of the copolymer of the present invention enables production of a carbon dioxide gas separation membrane excellent in carbon dioxide gas permeance and durability.

DESCRIPTION OF EMBODIMENTS

Hereinafter, the present invention will be described in detail.

(Hydrocarbon-Based Polymer)

First, a hydrocarbon-based polymer which can be used in a resin composition in one embodiment of the present invention will be described. The hydrocarbon-based polymer for use in the present invention contains a structural unit represented by the following formula (I).

(I)

In the formula (I), Ar represents an arylene group forming a main chain; and the arylene group has at least one directly or indirectly bonded ion-exchange group, and may have at least one group selected from the group consisting of a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group. m represents an integer greater than or equal to 1, and n represents an integer greater than or equal to 2.

A plurality of occurrences of Ar may be the same, or different. Y represents a direct bond, $SO_2$, CO or O. A plurality of occurrences of Y may be the same, or different.

Such a hydrocarbon-based polymer offers the advantage that a carbon dioxide gas separation membrane prepared by a method as described later has proper mechanical strength with a reduced swelling degree while maintaining sufficient water retainability for permeation of a carbon dioxide gas.

Ar in the formula (I) is an arylene group forming a main chain, and the arylene group has at least one directly or indirectly bonded ion-exchange group. Specifically, the ion-exchange group may be directly bonded to an aromatic ring of the arylene group forming a main chain, or may be indirectly bonded thereto via a group included in the arylene group forming a main chain, but it is preferably directly bonded to the aromatic ring of the arylene group. The arylene group is, for example, a monocyclic aromatic group such as a phenylene group, a fused-ring aromatic group such as a naphthalenediyl group, or an aromatic heterocyclic group such as a pyridinediyl group, a quinoxalinediyl group or a thiophenediyl group. Particularly, divalent arylene groups represented by the following formulae (ca) to (cj) are preferable because a raw material easily available on an industrial scale can be used, or a raw material that facilitates production can be used. Particularly, the group represented by the formula (cb) is especially preferable because of excellent dimensional stability in water absorption and swelling as well as excellent water resistance.

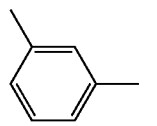
(ca)

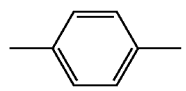
(cb)

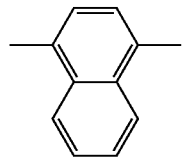
(cc)

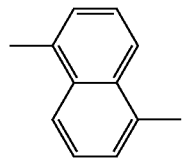
(cd)

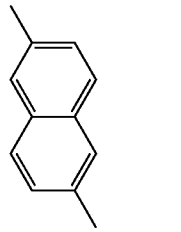
(ce)

-continued

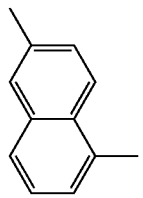
(cf)

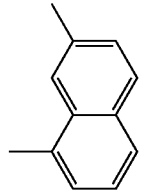
(cg)

(ch)

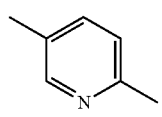
(ci)

(cj)

Examples of the ion-exchange group that is directly or indirectly bonded to the arylene group include the above-mentioned groups, and preferred examples thereof are the same as those described above.

The arylene group may have, in addition to the ion-exchange group, a group selected from a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group.

Examples of the preferred group include an alkyl group having 1 to 20 carbon atoms and optionally having a substituent group, an aryl group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, and a cyano group. A polyarylene-based block copolymer having such a group is preferable because it has high hydrolysis resistance. An example of an especially preferred group includes an acyl group having 2 to 20 carbon atoms and optionally having a substituent group. A polyarylene-based block copolymer having such a group is preferable because it is excellent in water resistance.

When the arylene group has an acyl group, there is the possibility that two structural units each having the acyl group are adjacent to each other, and the acyl groups in the two structural units are bonded to each other, or a rearrangement reaction occurs after the acyl groups are bonded to each other. Even a hydrocarbon-based polymer in which acyl groups are linked to each other as described above is encompassed in the polymer of the present invention when the group after bonding (rearrangement reaction) is an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, or an acyl group having 2 to 20 carbon atoms and optionally having a substituent group. Whether or not such a reaction that acyl groups are bonded to each other, or a rearrangement reaction occurs after bonding occurs can be determined by, for example, $^{13}$C-nuclear magnetic resonance spectrum measurement.

Examples of the alkyl group having 1 to 20 carbon atoms and optionally having a substituent group include alkyl groups having 1 to 20 carbon atoms, such as a methyl group, an ethyl group, an n-propyl group, an isopropyl group, an n-butyl group, a sec-butyl group, an isobutyl group, an n-pentyl group, a 2,2-dimethylpropyl group, a cyclopentyl group, an n-hexyl group, a cyclohexyl group, a 2-methylpentyl group, a 2-ethylhexyl group, a nonyl group, a dodecyl group, a hexadecyl group, an octadecyl group and an icosyl group, and alkyl groups having less than or equal to 20 carbon atoms in total, in which the above-mentioned alkyl group has a hydroxyl group, a cyano group, an amino group, a methoxy group, an ethoxy group, an isopropyloxy group, a phenyl group, a naphthyl group, a phenoxy group, a naphthyloxy group, etc. as the substituent group.

Examples of the alkoxy group having 1 to 20 carbon atoms and optionally having a substituent group include alkoxy groups having 1 to 20 carbon atoms, such as a methoxy group, an ethoxy group, an n-propyloxy group, an isopropyloxy group, an n-butyloxy group, a sec-butyloxy group, a tert-butyloxy group, an isobutyloxy group, an n-pentyloxy group, a 2,2-dimethylpropyloxy group, a cyclopentyloxy group, an n-hexyloxy group, a cyclohexyloxy group, a 2-methylpentyloxy group, a 2-ethylhexyloxy group, a dodecyloxy group, a hexadecyloxy group and an icosyloxy group, and alkoxy groups having less than or equal to 20 carbon atoms in total, in which the above-mentioned alkoxy group has one or more substituent groups selected from the following group of substituent groups.

[Group of Substituent groups] alkyl groups having 1 to 19 carbon atoms, such as a methyl group, an ethyl group, an n-propyl group, an isopropyl group, an n-butyl group, a sec-butyl group, an isobutyl group, an n-pentyl group, a 2,2-dimethylpropyl group, a cyclopentyl group, an n-hexyl group, a cyclohexyl group, a 2-methylpentyl group, a 2-ethylhexyl group, a nonyl group and a dodecyl group; alkyl groups having less than or equal to 19 carbon atoms in total, in which the above-mentioned alkyl group has a hydroxyl group, a cyano group, an amino group, a phenyl group, a naphthyl group, etc. as a substituent group; and a hydroxyl group, a cyano group, an amino group, a methoxy group, an ethoxy group, an isopropyloxy group, a phenyl group, a naphthyl group, a phenoxy group, a naphthyloxy group, etc.

Examples of the aryl group having 6 to 20 carbon atoms and optionally having a substituent group include aryl groups such as a phenyl group, a naphthyl group, a phenanthrenyl group and an anthracenyl group, and aryl groups having less than or equal to 20 carbon atoms in total, in which the above-mentioned aryl group has one or more substituent groups selected from the following group of substituent groups.

[Group of Substituent groups] alkyl groups having 1 to 14 carbon atoms, such as a methyl group, an ethyl group, an n-propyl group, an isopropyl group, an n-butyl group, a sec-butyl group, an isobutyl group, an n-pentyl group, a 2,2-dimethylpropyl group, a cyclopentyl group, an n-hexyl group, a cyclohexyl group, a 2-methylpentyl group, a 2-ethylhexyl group, a nonyl group and a dodecyl group; alkyl groups having less than or equal to 14 carbon atoms in total, in which the above-mentioned alkyl group has a hydroxyl group, a cyano group, an amino group, a phenyl group, a naphthyl group, etc. as a substituent group; and a hydroxyl group, a cyano group, an amino group, a methoxy group, an ethoxy group, an isopropyloxy group, a phenyl group, a naphthyl group, a phenoxy group, a naphthyloxy group, etc.

Examples of the aryloxy group having 6 to 20 carbon atoms and optionally having a substituent group include aryloxy groups such as a phenoxy group, a naphthyloxy group, a phenanthrenyloxy group and an anthracenyloxy group, and aryloxy groups having less than or equal to 20 carbon atoms in total, in which the above-mentioned aryloxy group has one or more substituent groups selected from the following group of substituent groups.

[Group of Substituent groups] alkyl groups having 1 to 14 carbon atoms, such as a methyl group, an ethyl group, an n-propyl group, an isopropyl group, an n-butyl group, a sec-butyl group, an isobutyl group, an n-pentyl group, a 2,2-dimethylpropyl group, a cyclopentyl group, an n-hexyl group, a cyclohexyl group, a 2-methylpentyl group, a 2-ethylhexyl group, a nonyl group and a dodecyl group; alkyl groups having less than or equal to 14 carbon atoms in total, in which the above-mentioned alkyl group has a hydroxyl group, a cyano group, an amino group, a phenyl group, a naphthyl group, etc. as a substituent group; and a hydroxyl group, a cyano group, an amino group, a methoxy group, an ethoxy group, an isopropyloxy group, a phenyl group, a naphthyl group, a phenoxy group, a naphthyloxy group, etc.

Examples of the acyl group having 2 to 20 carbon atoms and optionally having a substituent group include acyl groups having 2 to 20 carbon atoms, such as an acetyl group, a propionyl group, a butyryl group, an isobutyryl group, a benzoyl group, a 1-naphthoyl group and a 2-naphthoyl group, and acyl groups having less than or equal to 20 carbon atoms in total, in which the above-mentioned acyl group has one or more substituent groups selected from the following group of substituent groups.

[Group of Substituent groups] alkyl groups having 1 to 18 carbon atoms, such as a methyl group, an ethyl group, an n-propyl group, an isopropyl group, an n-butyl group, a sec-butyl group, an isobutyl group, an n-pentyl group, a 2,2-dimethylpropyl group, a cyclopentyl group, an n-hexyl group, a cyclohexyl group, a 2-methylpentyl group, a 2-ethylhexyl group, a nonyl group and a dodecyl group; alkyl groups having less than or equal to 18 carbon atoms in total, in which the above-mentioned alkyl group has a hydroxyl group, a cyano group, an amino group, a phenyl group, a naphthyl group, etc. as a substituent group; and a hydroxyl group, a cyano group, an amino group, a methoxy group, an ethoxy group, an isopropyloxy group, a phenyl group, a naphthyl group, a phenoxy group, a naphthyloxy group, etc.

Examples of the arylsulfonyl group having 6 to 20 carbon atoms and optionally having a substituent group include arylsulfonyl groups having 6 to 20 carbon atoms, such as a benzenesulfonyl group, a 1-naphthalenesulfonyl group and a 2-naphthalenesulfonyl group, and arylsulfonyl groups having less than or equal to 20 carbon atoms in total, in which the above-mentioned arylsulfonyl group has one or more substituent groups selected from the following group of substituent groups.

[Group of Substituent groups] alkyl groups having 1 to 14 carbon atoms, such as a methyl group, an ethyl group, an n-propyl group, an isopropyl group, an n-butyl group, a sec-butyl group, an isobutyl group, an n-pentyl group, a 2,2-dimethylpropyl group, a cyclopentyl group, an n-hexyl group, a cyclohexyl group, a 2-methylpentyl group, a 2-ethylhexyl group, a nonyl group and a dodecyl group; alkyl groups having less than or equal to 14 carbon atoms in total, in which the above-mentioned alkyl group has a hydroxyl group, a cyano group, an amino group, a phenyl group, a naphthyl group, etc. as a substituent group; and a hydroxyl group, a cyano group, an amino group, a methoxy group, an ethoxy group, an isopropyloxy group, a phenyl group, a naphthyl group, a phenoxy group, a naphthyloxy group, etc.

Examples of the alkylsulfonyl group having 1 to 20 carbon atoms and optionally having a substituent group include alkylsulfonyl groups having 1 to 20 carbon atoms, such as a methylsulfonyl group, an ethylsulfonyl group, an n-propylsulfonyl group, an isopropylsulfonyl group, an n-butylsulfonyl group, a sec-butylsulfonyl group, an isobutylsulfonyl group, an n-pentylsulfonyl group, a 2,2-dimethylpropylsulfonyl group, a cyclopentylsulfonyl group, an n-hexylsulfonyl group, a cyclohexylsulfonyl group, a 2-methylpentylsulfonyl group, a 2-ethylhexylsulfonyl group, a nonylsulfonyl group and a dodecylsulfonyl group, and alkylsulfonyl groups having less than or equal to 20 carbon atoms in total, in which the above-mentioned alkylsulfonyl group has one or more substituent groups selected from the following group of substituent groups.

[Group of Substituent groups] a hydroxyl group, a cyano group, an amino group, a methoxy group, an ethoxy group, an isopropyloxy group, a phenyl group, a naphthyl group, a phenoxy group, a naphthyloxy group, etc.

m in the Formula (I) is an integer greater than or equal to 1. m is preferably less than or equal to 1000, further preferably less than or equal to 500. It is preferable that m be in the above-mentioned range because the resulting carbon dioxide gas separation membrane has sufficient mechanical strength, and production is facilitated.

n in the Formula (I) is an integer greater than or equal to 2. n is preferably less than or equal to 1000, further preferably less than or equal to 500. It is preferable that n be in the above-mentioned range because the resulting carbon dioxide gas separation membrane has sufficient mechanical strength, and production is facilitated.

Y in the formula (I) represents a direct bond, $SO_2$, CO or O, and is preferably a direct bond from the viewpoint of heat resistance.

The "hydrocarbon-based polymer" means a polymer in which the total content of carbon atoms and hydrogen atoms is greater than or equal to 50 mol % in terms of mass content ratio of elements that form the polymer.

The "hydrocarbon-based polymer" mentioned here may contain other atoms in addition to carbon atoms and hydrogen atoms, and examples of other elements include heteroatoms such as nitrogen, oxygen, sulfur, halogen and silicon atoms.

The hydrocarbon-based polymer for use in the present invention has an ion-exchange group for achieving water retainability that is necessary for permeation of a carbon dioxide gas when a carbon dioxide gas separation membrane is obtained. The ion-exchange group is contained in a structural unit represented by the formula (I), but may additionally be contained in other structural units.

The ion-exchange group is an acidic ion-exchange group (i.e. cation-exchange group) or a basic ion-exchange group (i.e. anion-exchange group). The ion-exchange group is preferably a cation-exchange group for achieving necessary water retainability.

Examples of the cation-exchange group include a sulfo group ($-SO_3H$), a carboxyl group (—COOH), a phosphono group ($-PO_3H_2$), a sulfonylimide group ($-SO_2NHSO_2-$) and a phenolic hydroxyl group. Among them, the cation-exchange group is preferably a sulfo group or a phosphono group, especially preferably a sulfo group. The ion-exchange group may be partially or totally exchanged with metal ions, quaternary ammonium ions, etc. to form a salt.

The ion-exchange group may be introduced in one or both of the main chain and the side chain of the polymer, but it is preferable that the ion-exchange group be introduced in the main chain. The main chain of the polymer means the longest chain in the hydrocarbon-based polymer according to the present invention. This chain is composed of carbon atoms that are mutually covalently bonded, and this chain may be interrupted by a nitrogen atom, an oxygen atom, a sulfur atom etc.

The introduced amount of the ion-exchange group may be represented by an ion-exchange group capacity that is the number of ion-exchange groups per unit mass of the hydrocarbon-based polymer.

The "ion-exchange group capacity" is a value defined by the equivalent number of ion-exchange groups contained per 1 g of dry resin [milliequivalent/g of dry resin] (hereinafter, sometimes referred to as meq/g) in the hydrocarbon-based polymer that constitutes the resin composition.

The "dry resin" is a resin obtained by holding the hydrocarbon-based polymer at a temperature equal to or higher than the boiling point of water, so that there is almost no mass decrease, and thus a change in mass with time is converged on almost a constant value.

In the hydrocarbon-based polymer for use in the present embodiment, introduced amount of the ion-exchange groups is preferably greater than or equal to 0.5 meq/g and less than or equal to 6.0 meq/g; more preferably greater than or equal to 1.0 meq/g and less than or equal to 6.0 meq/g; further preferably greater than or equal to 2.0 meq/g and less than or equal to 5.5 meq/g; most preferably greater than or equal to 2.7 meq/g and less than or equal to 5.0 meq/g in terms of the ion-exchange group capacity.

The hydrocarbon-based polymer is preferably a hydrocarbon-based polymer in which the ion-exchange group is introduced in a polymer with the main chain including an aromatic ring for achieving heat resistance that is necessary when a carbon dioxide gas separation membrane is obtained.

Hydrocarbon-based polymers described below as an example are mainly hydrocarbon-based polymers in which the ion-exchange group is a sulfo group, but a hydrocarbon-based polymer in which the sulfo group is replaced by another ion-exchange group may also be used.

The hydrocarbon-based polymer in which the ion-exchange group is introduced in a polymer with the main chain including an aromatic ring may be a hydrocarbon-based polymer with the main chain including a heteroatom such as an oxygen atom. Such a hydrocarbon-based polymer is, for example, a hydrocarbon-based polymer in which sulfo groups are introduced in a homopolymer such as polyether ketone, polyether ether ketone, polysulfone, polyether sulfone, polyether ether sulfone, poly(aryleneether), polyimide, poly((4-phenoxybenzoyl)-1,4-phenylene) or polyphenylquinoxalene. Specific examples include sulfoarylated polybenzimidazole and sulfoalkylated benzimidazole (see, for example, Japanese Patent Laying-Open No. 9-110982). The hydrocarbon-based polymer in which the ion-exchange group is introduced in a polymer with the main chain including an aromatic ring may be a compound in which the main chain is interrupted by a heteroatom such as an oxygen atom, and examples of the hydrocarbon-based polymer in which the ion-exchange group is introduced in a polymer with the main chain including an aromatic ring include polyether ether ketone, polysulfone, polyether sulfone, poly(aryleneether), polyimide, poly((4-phenoxybenzoyl)-1,4-phenylene), polyphenylene sulfide, polyphenylquinoxalene, sulfoarylated polybenzimidazole, sulfoalkylated polybenzimidazole, phosphoalkylated polybenzimidazole and phosphonated poly(phenylene ether). Such hydrocarbon-based polymers are also described in Japanese Patent Laying-Open No. 9-110982 and J. Appl. Polym. Sci., 18, 1969 (1974).

For obtaining a carbon dioxide gas separation membrane having good heat resistance as a carbon dioxide gas separation membrane, the hydrocarbon-based polymer is preferably a hydrocarbon-based polymer which has an aromatic ring forming a main chain and has an ion-exchange group directly or indirectly bonded to the aromatic ring. Further, the hydrocarbon-based polymer is preferably an aromatic polymer which has an aromatic forming a main chain and may have a side chain including an aromatic ring, and which has an ion-exchange group directly bonded to one of the aromatic ring forming the main chain, and the aromatic ring on the side chain. Particularly, the hydrocarbon-based polymer is preferably an aromatic polymer which has an aromatic forming a main chain and may have a side chain including an aromatic ring, and which has an ion-exchange group directly bonded to the aromatic ring forming the main chain.

Further, the hydrocarbon-based polymer used for the resin composition in an embodiment of the present invention is preferably a copolymer including a structural unit having an ion-exchange group and a structural unit having no ion-exchange group. For such a copolymer, the copolymerization mode of the two structural units may be any of random copolymerization, block copolymerization, graft copolymerization and alternating copolymerization, or may be a combination of these copolymerization modes.

An example of an especially preferred aromatic polymer having an ion-exchange group includes, for example, a polymer which includes a structural unit having an ion-exchange group and a structural unit having no ion-exchange group in the molecular structure.

Examples of the structural unit having an ion-exchange group may include structural units represented by the formula (I), and more specific examples thereof may include structural units represented by the following formulae (11a) to (14a).

(11a)

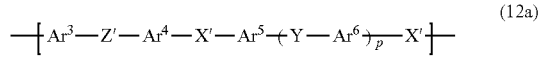
(12a)

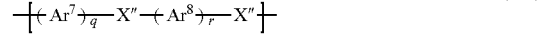
(13a)

(14a)

In the above formulae, $Ar^1$ to $Ar^9$ are the same or mutually different, and each represent an arylene group forming a main chain; and the arylene group has at least one directly or indirectly bonded ion-exchange group, and may have at least one group selected from the group consisting of a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group. Z and Z' are the same or mutually different, and each represent CO or $SO_2$; X, X' and X'' are the same or mutually different, and each represent O or S; Y represents a direct bond, or a group represented by the following formula (15); p represents 0, 1 or 2; and q and r are the same or mutually different, and each represent 1, 2 or 3.

Examples of the structural unit having no ion-exchange group may include structural units represented by the following formulae (11b) to (14b).

(11b)

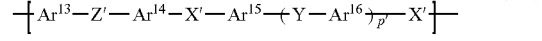
(12b)

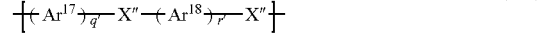
(13b)

(14b)

In the above formulae, $Ar^{11}$ to $Ar^{19}$ are the same or mutually different, and each represent an arylene group forming a main chain; and the arylene group may have at least one group selected from the group consisting of a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group. It is to be noted that the arylene group has no ion-exchange group. Z and Z' are the same or mutually different, and each represent CO or $SO_2$; X, X' and X'' are the same or mutually different, and each represent O or S; Y represents a direct bond, or a group represented by the following formula (15); p' represents 0, 1 or 2; and q' and r' are the same or mutually different, and each represent 1, 2 or 3.

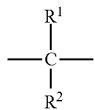

(15)

In the above formula, $R^1$ and $R^2$ are the same or mutually different, and each represent a hydrogen atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, or a cyano group. $R^1$ and $R^2$ may be linked together to form a ring, and examples of the group of the formula (15), which has a ring formed with $R^1$ and $R^2$ linked together, include divalent cyclic hydrocarbon groups having 5 to 20 carbon atoms, such as a cyclohexylidene group.

In the formulae (11a) to (14a) each representing a structural unit having an ion-exchange group, $Ar^1$ to $Ar^9$ each represent an arylene group forming a main chain, and the arylene group has at least one directly or indirectly bonded ion-exchange group. Details and specific examples thereof are the same as those described above, and preferred examples thereof are the same as those described above. Examples of the ion-exchange group that is directly or indirectly bonded to the arylene group include the above-mentioned groups, and preferred examples thereof are the same as those described above. The arylene group may have, in addition to the ion-exchange group, a group selected from a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group. Specific examples thereof are the same as those described above, and preferred examples thereof are the same as those described above.

In the formulae (11b) to (14b) each representing a structural unit having no ion-exchange group, $Ar^{11}$ to $Ar^{19}$ each represent an arylene group forming a main chain. The arylene group is the same as that described above, and preferred examples thereof are the same as those described above. The arylene group may have, in addition to the ion-exchange group, a group selected from a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group. Specific examples thereof are the same as those described above, and preferred examples thereof are the same as those described above.

In the formula (15), $R^1$ and $R^2$ are the same or mutually different, and each represent a hydrogen atom, an alkyl group having 1 to 20 carbon atoms and optionally having a substituent group, an alkoxy group having 1 to 20 and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, or a cyano group. Specific examples thereof are the same as those described above, and preferred examples thereof are the same as those described above.

In the present invention, a suitable hydrocarbon-based polymer is a hydrocarbon-based polymer which has a structural unit including a structural unit represented by each of the formulae (11a) to (14a) and having an ion-exchange group, and a structural unit including a structural unit represented by each of the formulae (11b) to (14b) and having no ion-exchange group. Such a hydrocarbon-based polymer can be obtained as a copolymer in which a starting substance is a monomer or oligomer corresponding to each of a structural unit having an ion-exchange group and a structural unit having no ion-exchange group. Examples of a further suitable combination of a structural unit having an ion-exchange group and a structural unit having no ion-exchange group include combinations shown in <A> to <M> in Table 1 below.

TABLE 1

| Copolymer | Structural unit having ion-exchange group | Structural unit having no ion-exchange group |
|---|---|---|
| <A> | (11a) | (11b) |
| <B> | (11a) | (13b) |
| <C> | (12a) | (11b) |
| <D> | (12a) | (13b) |
| <E> | (13a) | (11b) |
| <F> | (13a) | (13b) |
| <G> | (14a) | (11b) |
| <H> | (14a) | (13b) |
| <I> | (11a) | (12b) |
| <J> | (12a) | (12b) |
| <K> | (13a) | (12b) |
| <L> | (14a) | (12b) |
| <M> | (14a) | (14b) |

The structure of a hydrocarbon-based polymer that is suitably used in the present invention is further preferably the structure of <B>, <C>, <D>, <G>, <H>, <I>, <J>, <L> or <M>, further more preferably the structure of <G>, <H>, <L> or <M>.

Examples of the suitable copolymer may include copolymers which include one or more structural units selected from the group of structural units having an ion-exchange group as shown below and one or more structural units selected from the group of structural units having no ion-exchange group as shown below. In the following structural units, a suitable sulfo group is shown as the ion-exchange group in the repeating unit having an ion-exchange group.

Any of the above-mentioned ion-exchange groups may be employed instead of a sulfo group.

These structural units may be directly bonded together, or may be linked together via an appropriate atom or group of atoms. Typical examples of the atom or group of atoms that bonds the structural units together herein may include an arylene group, an oxygen atom, a sulfur atom, a carbonyl group, a sulfonyl group and divalent groups formed by combination thereof.

(Structural Unit Having Ion-Exchange Group)

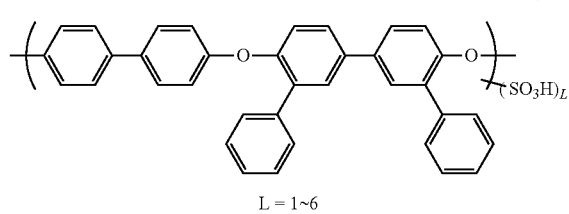
(4a-1)
L = 1~6

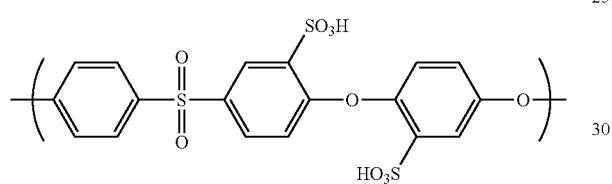
(4a-2)

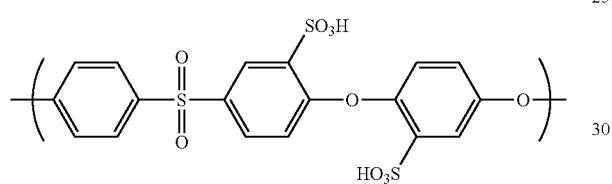
(4a-3)

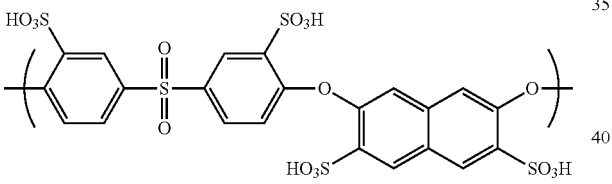
(4a-4)

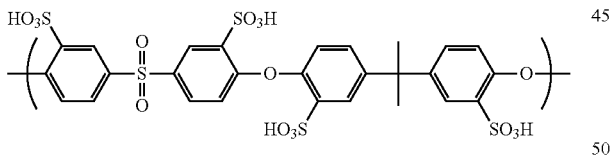
(4a-5)

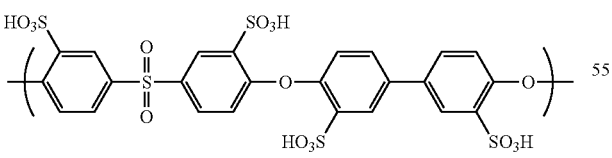
(4a-6)

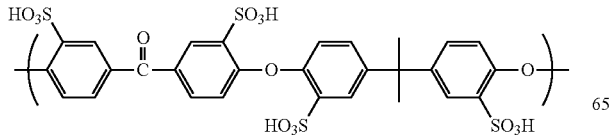

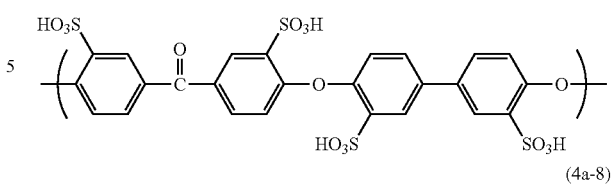
(4a-7)

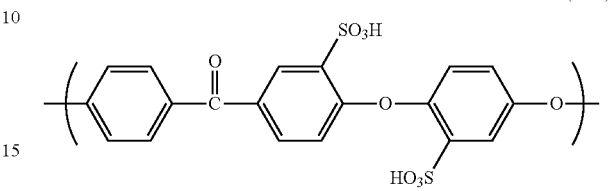
(4a-8)

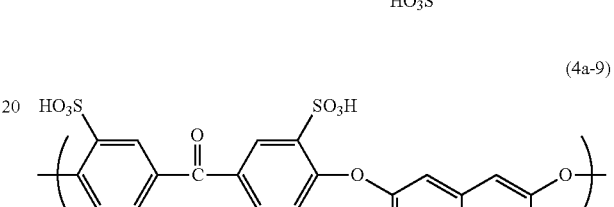
(4a-9)

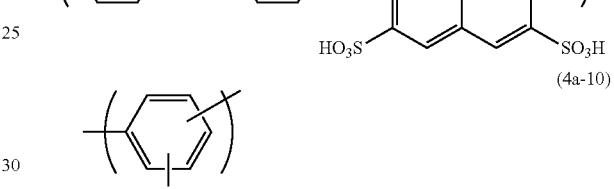
(4a-10)

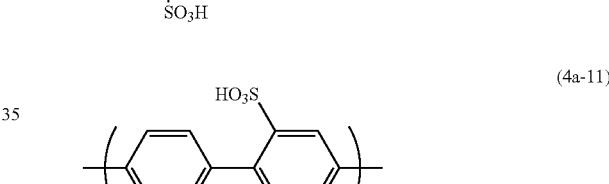
(4a-11)

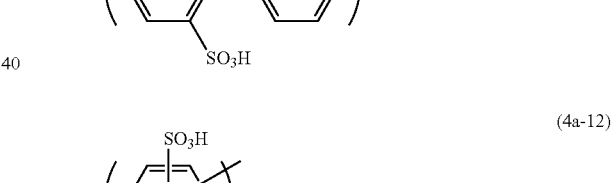
(4a-12)

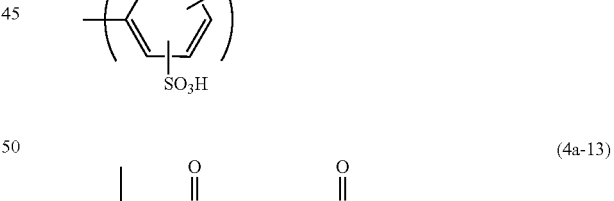
(4a-13)

(4a-14)

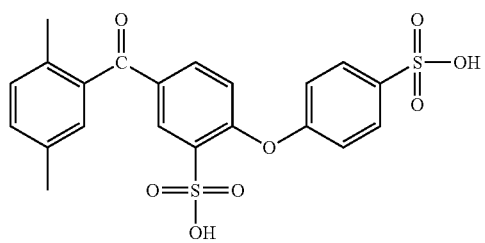
(4a-15)
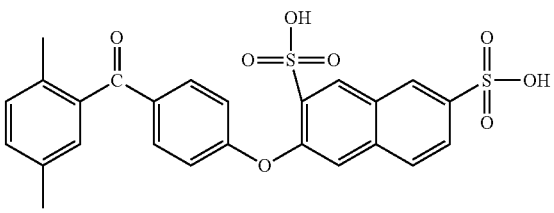
(4a-18)
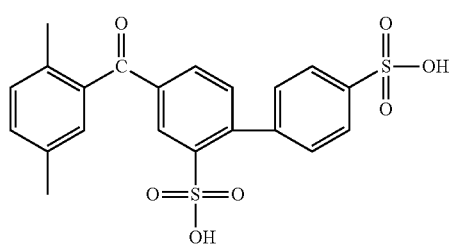
(4a-16)
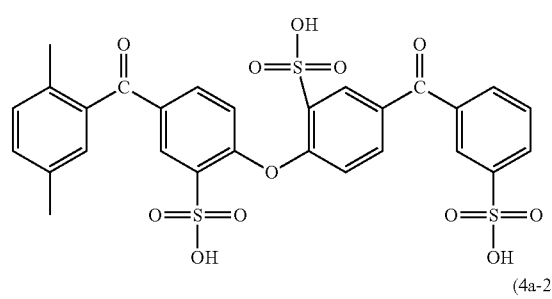
(4a-19)
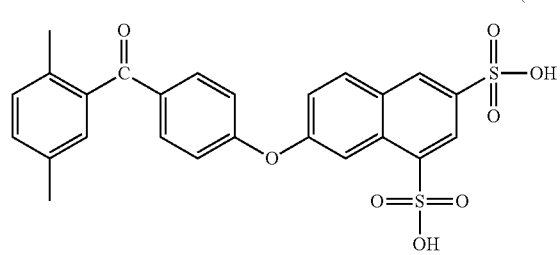
(4a-17)
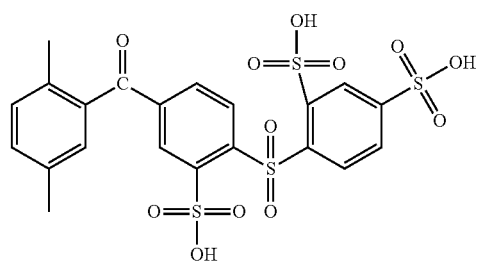
(4a-20)
(Structural Unit Having No Ion-Exchange Group)
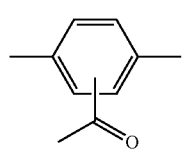
(4b-0)
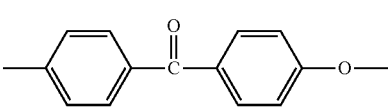
(4b-1)
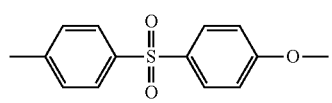
(4b-2)
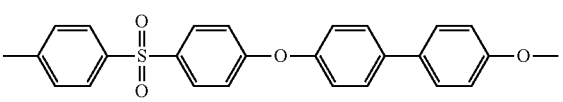
(4b-3)
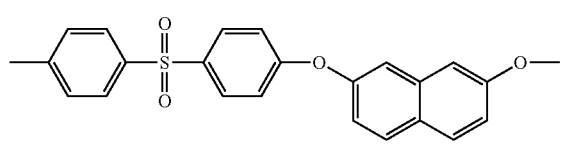
(4b-4)
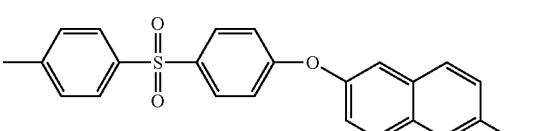
(4b-5)
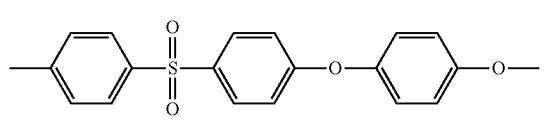
(4b-6)
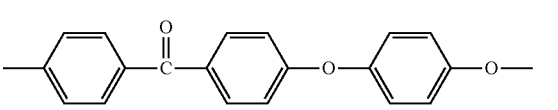
(4b-7)
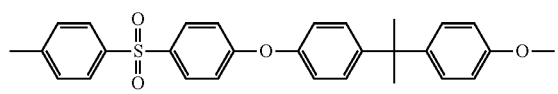
(4b-8)
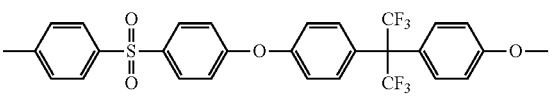
(4b-9)

-continued
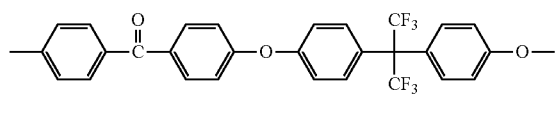
(4b-10)
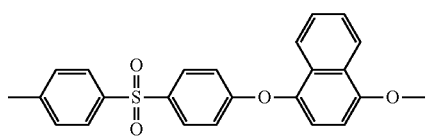
(4b-11)
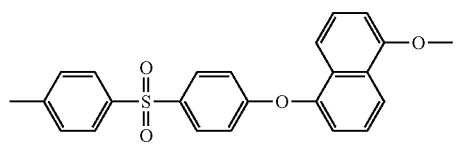
(4b-12)
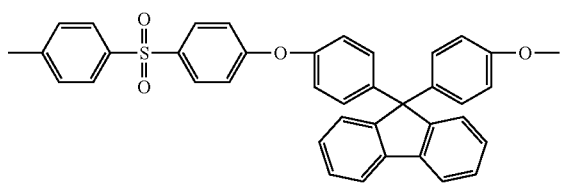
(4b-13)
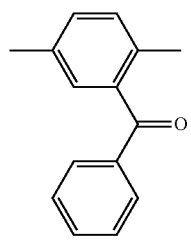
(4b-14)
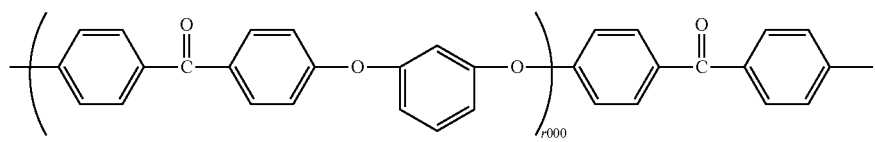
(4b-15)
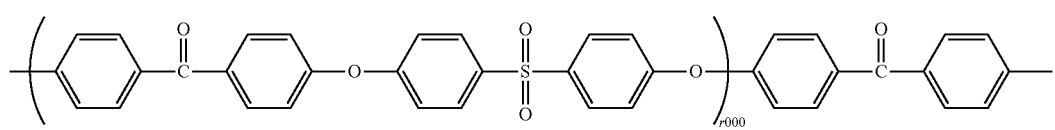
(4b-16)
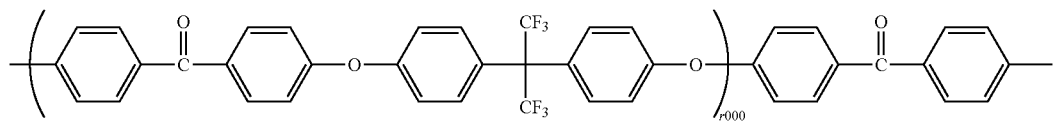
(4b-17)
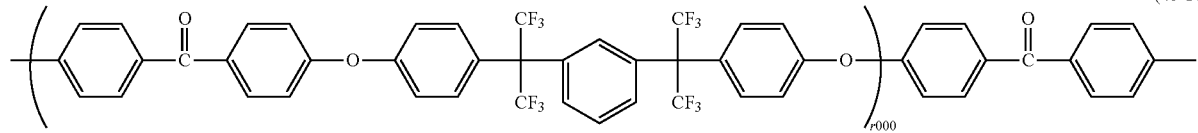
(4b-18)
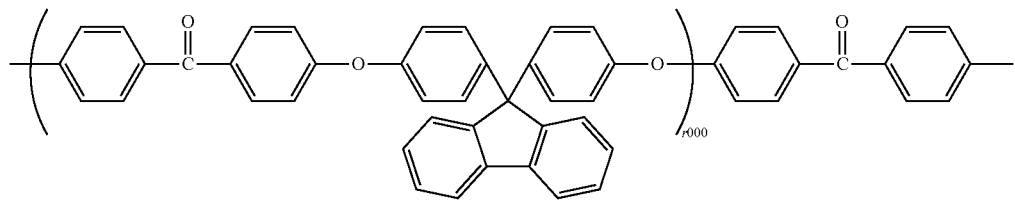
(4b-19)
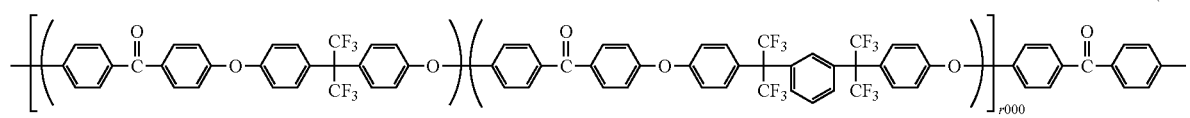
(4b-20)

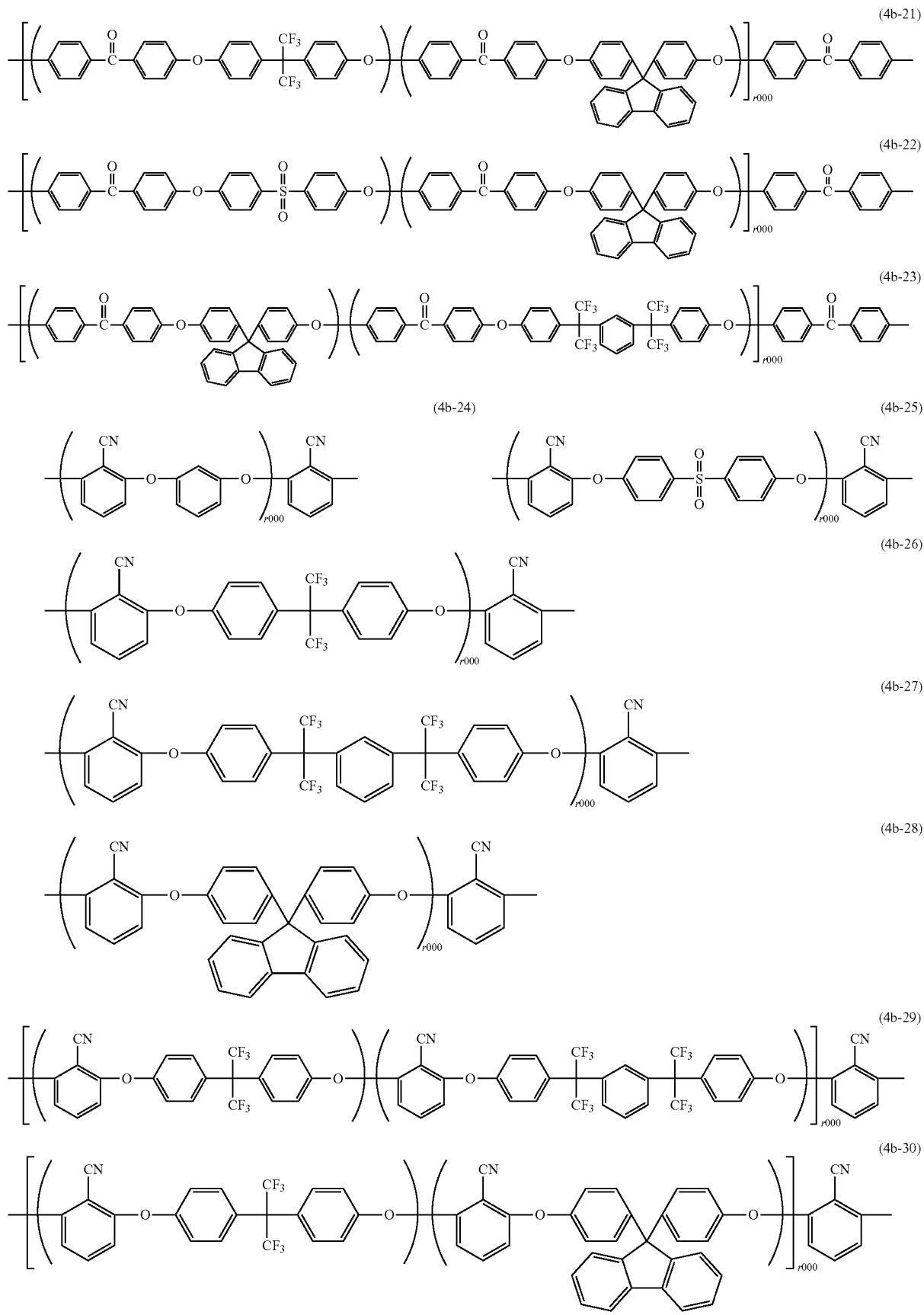

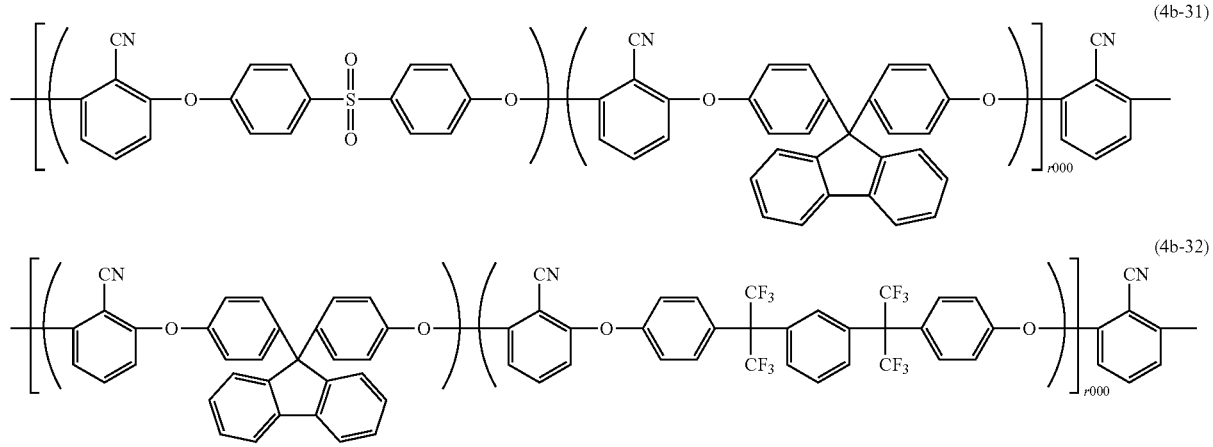

In the formulae (4b-15) to (4b-32), r000 represents 0 or an integer greater than or equal to 1; and r000 is preferably less than or equal to 100, more preferably greater than or equal to 1 and less than or equal to 80.

Among the above examples, one or more structural units selected from the group consisting of the structural units of the formulae (4a-1), (4a-2), (4a-3), (4a-4), (4a-5), (4a-6), (4a-7), (4a-8), (4a-9), (4a-10), (4a-11) and (4a-12) are preferable as a structural unit having an ion-exchange group. Similarly, one or more structural units selected from the group consisting of the structural units of the formulae (4a-10), (4a-11) and (4a-12) are more preferable; and the structural unit of the formula (4a-11) or (4a-12) is especially preferable.

A hydrocarbon-based polymer including a segment containing such a structural unit, particularly a hydrocarbon-based polymer including a segment containing such a structural unit as a repeating unit (segment having an ion-exchange group) tends to have relatively high chemical stability because this segment has a polyarylene structure.

One or more structural units selected from the group consisting of the structural units of the formulae (4b-0), (4b-1), (4b-2), (4b-3), (4b-4), (4b-5), (4b-6), (4b-7), (4b-8), (4b-9), (4b-10), (4b-11), (4b-12), (4b-13) and (4b-14) are preferable as a structural unit having no ion-exchange group. Similarly, one or more structural units selected from the group consisting of the structural units of the formulae (4b-0), (4b-2), (4b-3), (4b-10), (4b-13) and (4b-14) are preferable; and one or more structural units selected from the group consisting of the structural units of the formulae (4b-0), (4b-2), (4b-3) and (4b-14) are especially preferable.

The hydrocarbon-based polymer according to the present invention is preferably a hydrocarbon-based polymer which includes a structural unit having an ion-exchange group and a structural unit having no ion-exchange group. The copolymerization mode of the two structural units may be any of random copolymerization, alternating copolymerization, block copolymerization and graft copolymerization, or may be a combination of these copolymerization modes. The copolymerization mode is preferably random copolymerization, block copolymerization or graft copolymerization; more preferably random copolymerization or block copolymerization.

The block copolymer is preferably a copolymer which includes a segment mainly composed of a structural unit having an ion-exchange group (i.e. segment having an ion-exchange group) and a segment mainly composed of a structural unit having no ion-exchange group (i.e. segment having substantially no ion-exchange group). Examples of the suitable combination of a structural unit that forms a segment having an ion-exchange group and a structural unit that forms a segment having substantially no ion-exchange group may include combinations of segments as shown in <A> to <M> in Table 2 below.

TABLE 2

| Copolymer | Structural unit that forms segment having ion-exchange group | Structural unit that forms segment having no ion-exchange group |
| --- | --- | --- |
| <A> | (11a) | (11b) |
| <B> | (11a) | (13b) |
| <C> | (12a) | (11b) |
| <D> | (12a) | (13b) |
| <E> | (13a) | (11b) |
| <F> | (13a) | (13b) |
| <G> | (14a) | (11b) |
| <H> | (14a) | (13b) |
| <I> | (11a) | (12b) |
| <J> | (12a) | (12b) |
| <K> | (13a) | (12b) |
| <L> | (14a) | (12b) |
| <M> | (14a) | (14b) |

The combination of segments is further preferably that of <B>, <C>, <D>, <G>, <H>, <I>, <J>, <L> or <M>; furthermore preferably that of <G>, <H>, <L> or <M>; especially preferably that of <G>, <H> or <L>.

Among the above examples, one or more structural units selected from the group consisting of the structural units of the formulae (4a-1), (4a-2), (4a-3), (4a-4), (4a-5), (4a-6), (4a-7), (4a-8), (4a-9), (4a-10), (4a-11) and (4a-12) are preferable; one or more structural units selected from the group consisting of the structural units of the formulae (4a-10), (4a-11) and (4a-12) are more preferable; and the structural unit of the formula (4a-11) or (4a-12) is especially preferable as a structural unit to be used for the repeating unit that forms a segment having an ion-exchange group.

One of preferred embodiments of the block copolymer according to the present invention is a copolymer in which the main chain of a segment having an ion-exchange group has a polyarylene structure with substantially a plurality of aromatic rings directly linked together. The structural unit of the segment is preferably one or more structural units selected from the group consisting of the structural units of the formulae (4a-10), (4a-11), (4a-12), (4a-13), (4a-14), (4a-15), (4a-16), (4a-17), (4a-18), (4a-19) and (4a-20); more preferably one or more structural units selected from the group consisting of the structural units of the formulae (4a-10), (4a-11) and (4a-12); especially preferably the structural unit of the formula (4a-11) or (4a-12).

A hydrocarbon-based polymer including a segment containing a repeating unit consisting of such a structural unit (i.e. segment having an ion-exchange group), particularly a hydrocarbon-based polymer including a segment consisting of such a repeating unit can exhibit sufficient water retainability, and tends to have relatively high chemical stability because this segment has a polyarylene structure.

The "polyarylene structure" is an embodiment in which aromatic rings that form a main chain are substantially directly bonded together, and specifically, where the total number of bonds between the aromatic rings is 100%, the ratio of direct bonds is preferably greater than or equal to 80%, more preferably greater than or equal to 90%, further preferably greater than or equal to 95%. The embodiment other than the embodiment in which aromatic rings are directly bonded together is an embodiment in which aromatic rings are bonded together via a divalent atom or a divalent group of atoms.

As a formula representing a structural unit to be used for the repeating unit that forms a segment having no ion-exchange group, one or more structural units selected from the group consisting of the structural units of the formulae (4b-0), (4b-1), (4b-2), (4b-3), (4b-4), (4b-5), (4b-6), (4b-7), (4b-8), (4b-9), (4b-10), (4b-11), (4b-12), (4b-13) and (4b-14) are preferable; one or more structural units selected from the group consisting of the structural units of the formulae (4b-0), (4b-2), (4b-3), (4b-9), (4b-10), (4b-13) and (4b-14) are more preferable; one or more structural units selected from the group consisting of the structural units of the formulae (4b-0), (4b-2), (4b-3), (4b-13) and (4b-14) are further preferable; and one or more structural units selected from the group consisting of the structural units of the formulae (4b-0), (4b-2), (4b-3) and (4b-14) are especially preferable.

The segment having an ion-exchange group and the segment having substantially no ion-exchange group may be directly bonded together, or may be linked together via an appropriate atom or group of atoms. Typical examples of the atom or group of atoms that bonds the segments together herein may include an arylene group, an oxygen atom, a sulfur atom, a carbonyl group, a sulfonyl group and divalent groups formed by combination thereof. Examples of the arylene group include arylene groups that are the same as $Ar^1$ to $Ar^9$ in the formulae (11a) to (14a).

Examples of the suitable block copolymer may include block copolymers which include a segment containing one or more structural units selected from the group of structural units having an ion-exchange group (i.e. segment having an ion-exchange group) as shown above and a segment containing one or more structural units mainly selected from the group of structural units having no ion-exchange group (i.e. segment having substantially no ion-exchange group) as shown above.

The "segment having an ion-exchange group" means a segment containing 0.5 or more ion-exchange groups on average per one structural unit that forms the segment, more preferably 1.0 or more ion-exchange groups on average per one structural unit.

The "segment having substantially no ion-exchange group" means a segment containing less than 0.5 ion-exchange groups on average per one structural unit that forms the segment, more preferably 0.1 or less ion-exchange groups on average, further preferably 0.05 or less ion-exchange groups on average per one structural unit.

The block copolymer is typically a block copolymer in which a segment having an ion-exchange group and a segment having substantially no ion-exchange group are directly bonded together, or bonded together via an appropriate atom or group of atoms.

The polymerization degree of the segment containing one or more structural units selected from structural units represented by the formulae (11a) to (14a) is greater than or equal to 2, and preferably less than or equal to 1000, more preferably less than or equal to 500. When the polymerization degree is greater than or equal to 2, the hydrocarbon-based polymer for separation of a carbon dioxide gas exhibits sufficient water retainability, and when the polymerization degree is less than or equal to 1000, there is the advantage that production is further facilitated.

The polymerization degree of the segment containing one or more structural units selected from structural units represented by the formulae (11b) to (14b) is greater than or equal to 1, preferably greater than or equal to 2, more preferably greater than or equal to 3. The polymerization degree of the segment is preferably less than or equal to 100, more preferably less than or equal to 90, further preferably less than or equal to 80. It is preferable that the polymerization degree be in the above-mentioned range because the hydrocarbon-based polymer for separation of a carbon dioxide gas has sufficient mechanical strength, and production is facilitated. Specifically, the polymerization degree of the segment is preferably greater than or equal to 1 and less than or equal to 100; more preferably greater than or equal to 2 and less than or equal to 90; further preferably greater than or equal to 3 and less than or equal to 80.

The molecular weight of the hydrocarbon-based polymer for use in the present invention is preferably 5000 to 1000000, more preferably 10000 to 800000, further preferably 10000 to 600000, especially preferably 15000 to 400000 in terms of polystyrene equivalent number average molecular weight. When a hydrocarbon-based polymer having a molecular weight in the above-mentioned range is used, a hydrocarbon-based polymer membrane prepared by a method as described later tends to be able to stably maintain the shape of the membrane. The number average molecular weight is measured by gel permeation chromatography (GPC).

(Resin Composition and Method for Production Thereof)

The resin composition of the present invention includes a substance capable of reacting reversibly with a carbon dioxide gas, and the hydrocarbon-based polymer containing a structural unit represented by the formula (I).

Examples of the substance that is capable of reacting reversibly with a carbon dioxide gas may include alkali metal carbonates, alkali metal hydrogen carbonates, alkali metal hydroxides and alkanolamines as described in Japanese Patent Laying-Open No. 7-112122. The substance capable of reacting reversibly with a carbon dioxide gas is preferably an alkali metal carbonate, an alkali metal hydrogen carbonate or an alkali metal hydroxide, more preferably an alkali metal carbonate or an alkali metal hydrogen carbonate, further preferably cesium carbonate, cesium hydrogen carbonate, rubidium carbonate or rubidium hydrogen carbonate, further more preferably cesium carbonate.

The content of the substance capable of reacting reversibly with a carbon dioxide gas depends on the type of the substance capable of reacting reversibly with a carbon dioxide gas. In the case of cesium carbonate, the content of the substance capable of reacting reversibly with a carbon dioxide gas is preferably in the range of 20% by weight to 90% by weight, more preferably 45% by weight to 85% by weight based on the total weight of cesium carbonate and the hydrocarbon-based polymer.

The resin composition of the present invention is obtained using a production method including step A as described below.

A: a step of mixing a substance capable of reacting reversibly with a carbon dioxide gas with the hydrocarbon-based polymer.

The hydrocarbon-based polymer may be provided to step A as it is, or may be provided to step A after being subjected to a post-treatment such as a neutralization treatment.

It is preferable to further mix water in the mixing in step A. In the case where water is mixed, the use amount thereof is preferably an amount which ensures that the resulting resin composition can exist as a homogeneous solution at the time when it is provided to step B as described later. The order of mixing in step A is not particularly limited, and the mixing temperature is preferably in the range of 5° C. to 90° C.

(Carbon Dioxide Gas Separation Membrane and Method for Production Thereof)

The carbon dioxide gas separation membrane of the present invention includes a porous membrane carrying the resin composition of the present invention.

Examples of the porous membrane include porous membranes made of fluororesin, polyolefin, polyamide-based resin, polysulfone-based resin, ceramic and metal, and a porous membrane made of fluororesin is preferable. Particularly, an ethylene tetrafluoride copolymer (PTFE) porous membrane is preferable.

Preferably, the porous membrane has heat resistance to a temperature greater than or equal to 100° C., mechanical strength, and adhesion with the resin composition of the present invention. The porous membrane is preferably one having a porosity greater than or equal to 50% and a pore size greater than or equal to 0.01 µm and less than or equal to 10 µm, more preferably one having a porosity greater than or equal to 55% and a pore size greater than or equal to 0.1 µm and less than or equal to 1 µm.

The porous membrane is preferably hydrophilic. A laminate of a hydrophilic porous membrane and a hydrophobic porous membrane can also be used.

The method for producing the carbon dioxide gas separation membrane of the present invention includes steps A and B as described below.

A: a step of mixing a substance capable of reacting reversibly with a carbon dioxide gas with the hydrocarbon-based polymer.

B: a step of applying a resin composition to a porous membrane.

Step A is as described above. Preferably, the application in step B is performed so as to form on at least one surface of the porous membrane a layer containing a substance capable of reacting reversibly with a carbon dioxide gas, and the hydrocarbon-based polymer of the present invention.

Preferably, water is further mixed in step A for facilitating the application in step B. That is, the resin composition provided to step B preferably contains water, and it is more preferably in the form of an aqueous solution.

The application in step B can be performed by a method that is usually employed on an industrial scale, such as application using a coater (also referred to as a doctor blade), or application by brush coating. The thickness of the composition layer can be controlled by the thickness of a film formed by the applied composition, the concentrations of the hydrocarbon-based polymer and water in the resin composition, the quantitative ratio between the substance capable of reacting reversibly with a carbon dioxide gas and the hydrocarbon-based polymer, and so on.

When the resin composition supplied to step B contains water, it is preferable that the method for producing the carbon dioxide gas separation membrane of the present invention include steps C and D in order to form on at least one surface of the porous membrane a layer containing a substance capable of reacting reversibly with a carbon dioxide gas and a hydrocarbon-based polymer containing a structural unit represented by the formula (I).

C: a step of forming a composition layer by drying the applied composition.

D: a step of heat-treating the composition layer.

The drying in step C means that water contained mainly in the applied composition is removed. Such drying is performed by evaporating water from the applied film by natural drying under normal temperature and normal pressure, a heating means such as a thermostatic bath or a hot plate or a pressure reducing means such as a pressure reducing apparatus, or a combination of these means. Conditions of the heating means and the pressure reducing means can be appropriately selected as long as the air permeability of the porous membrane is not reduced, and for example in the case of a thermostatic bath or a hot plate, it is preferable to set the temperature thereof to be less than or equal to the melting point of the porous membrane. In the pressure reducing means, an applied material may be enclosed in an appropriate pressure reducing machine, followed by setting the internal pressure of the pressure reducing machine to about 1 to $1.0 \times 10^5$ Pa.

When the temperature in the heating means is in the heat treatment temperature range in step E as described later, step C and step D can be continuously carried out. For example, the applied composition can be dried in step C, and subsequently heat-treated under the same conditions in step D.

The heat treatment in step D is performed normally using a heating means such as a thermostatic bath or a hot plate. The heat treatment temperature is preferably in the range of 80° C. to 160° C. The heat treatment time depends on the heat treatment temperature, but it is preferably in the range of 10 minutes to 4 hours.

(Carbon Dioxide Gas Separation Membrane Module and Carbon Dioxide Gas Separation Apparatus)

The carbon dioxide gas separation membrane of the present invention can be modularized into a carbon dioxide gas separation membrane module. The carbon dioxide gas separation apparatus of the present invention includes a carbon dioxide gas separation membrane or a carbon dioxide gas separation membrane module, and has a means for separating and recovering or separating and refining a carbon dioxide gas.

The carbon dioxide gas separation membrane of the present invention can be modularized and suitably used. Examples of the type of module include a spiral type, a hollow fiber type, a pleat type, a tubular type and a plate/frame type. The carbon dioxide gas separation membrane of the present invention may be applied to, for example, a gas separation and recovery apparatus as a membrane/absorption hybrid method using an absorption liquid in combination as described in Japanese Patent Laying-Open No. 2007-297605.

EXAMPLES

Hereinafter, the present invention will be described by way of examples, but the present invention is not limited to these examples.

[Carbon Dioxide Permeance]

The carbon dioxide permeance [mol/m²/sec/kPa] was measured by an isopiestic method using a gas permeation measurement apparatus (manufactured by GTR Tec Corporation, Model: GTR-30XAF3SC). The temperature of cells sandwiching a carbon dioxide gas separation membrane was set to a predetermined temperature according to conditions. A carbon dioxide gas was fed to the feed side, and an argon gas was fed to the permeate side. The gases on the feed and permeate sides were humidified by passing through a bubbler heated to a predetermined temperature according to conditions. The flow rates of the carbon dioxide gas and the argon gas were each set to 20 cc/min. The back pressure was 0 kPaG on both the feed and permeate sides.

[Selectivity]

The helium permeance [mol/m²/sec/kPa] was measured by an isopiestic method using a gas permeation measurement apparatus (manufactured by GTR Tec Corporation, Model: GTR-30XAF3SC). The temperature of cells sandwiching a carbon dioxide gas separation membrane was set to 80° C. A helium gas was fed to the feed side, and an argon gas was fed to the permeate side. The gases on the feed and permeate sides were humidified by passing through a bubbler heated to 70° C. The flow rates of the helium gas and the argon gas were each set to 20 cc/min. The back pressure was 0 kPaG on both the feed and permeate sides. The selectivity was obtained from the following equation using the obtained helium permeance and carbon dioxide permeance.

(selectivity [-])=(carbon dioxide permeance [mol/m²/sec/kPa])/(helium permeance [mol/m²/sec/kPa])

[Water Absorption Ratio]

The water absorption amount of a carbon dioxide gas separation membrane at 80° C. and a relative humidity of 50% and 80% was measured using a humidity-controlled TG (manufactured by Seiko Instruments Inc., Model: EXSTAR 6000). Nitrogen gas was used as a humidification gas. The water absorption ratio was determined from the following equation.

(water absorption amount)/(dry total weight−dry porous base material weight)

[Heat Resistance Test]

A carbon dioxide gas separation membrane was placed in a sample tube, and left standing for 72 hours in a pressure cooker (manufactured by HIRAYAMA MANUFACTURING CORPORATION, Model: PC-304R8) set at 130° C. and a relative humidity of 90%. The carbon dioxide gas separation membrane was dissolved under high temperature and high pressure, and the amount of a gel layer fluidized in the sample tube was measured, and was normalized by the membrane area to examine heat resistance.

Synthesis Example 1

In accordance with the method described in Japanese Patent Laying-Open No. 2007-177197, a polymer 1 containing an ion-exchange group was synthesized, the polymer 1 having a structural unit represented by the following formula:

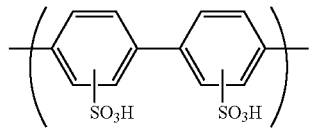

and a structural unit represented by the following formula:

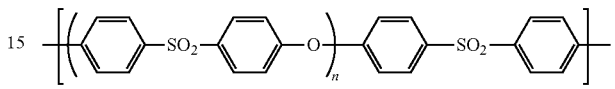

wherein n represents the number of repeating units. The ion-exchange capacity of polymer 1 containing an ion-exchange group was 2.70 meq/g.

Synthesis Example 2

In accordance with the method described in Japanese Patent Laying-Open No. 2011-102388, a polymer 2 containing an ion-exchange group was synthesized, the polymer 2 having a structural unit represented by the following formula:

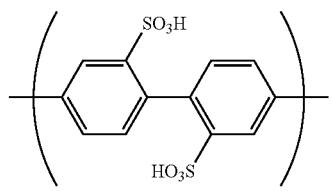

and a structural unit represented by the following formula:

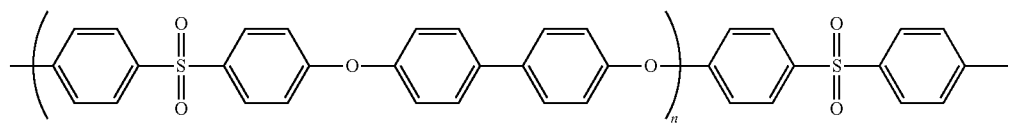

wherein n represents the number of repeating units. The ion-exchange capacity of polymer 2 containing an ion-exchange group was 4.70 meq/g.

Synthesis Example 3

Under a nitrogen atmosphere, 2.9 g (13.3 mmol) of anhydrous nickel bromide and 140 g of 1-methyl-2-pyrrolidone were mixed in a flask, and the mixture was heated to an internal temperature of 70° C., and stirred for 1 hour. This was cooled to 60° C., 2.3 g (14.6 mmol) of 2,2'-bipyridyl was added, and the mixture was cooled to 40° C. with stirring to prepare a nickel-containing solution.

Under a nitrogen atmosphere, 20.0 g (38.2 mmol) of 4,4'-dichlorobiphenyl-2,2'-di(2,2-dimethylpropyl) disulfonate and 5.4 g (28.3 mmol) of 2',5'-dichloroacetophenone were added in a flask, and dissolved in 400 g of 1-methyl-2-pyrrolidone, and the solution was adjusted to 50° C. To the resulting solution was added 8.7 g (133.1 mmol) of a zinc powder, and the mixture was cooled to 40° C. with stirring.

The nickel-containing solution was poured thereinto, and a polymerization reaction was carried out at 40° C. for 5 hours to obtain a black polymerization solution.

The resulting polymerization solution was added in 2400 g of a 6 mol/L aqueous hydrochloric acid solution at room temperature, and the mixture was stirred for 30 minutes. A crude polymer precipitated was filtered, and washed with water until the pH of the filtrate exceeded 4. Thereafter, the crude polymer was further washed with a large amount of methanol to obtain 19.5 g of a precursor for polymer 3 containing an ion-exchange group.

In a flask was added 19.0 g of the thus-obtained precursor for polymer 3 containing an ion-exchange group, the inside of the flask was sufficiently purged with nitrogen, and 51.7 g of water, 13.3 g (152.8 mmol) of anhydrous lithium bromide and 480 g of 1-methyl-2-pyrrolidone were added. The precursor for polymer 3 containing an ion-exchange group was sufficiently dissolved, and the solution was then heated to 120° C., and kept at this temperature with stirring for 12 hours to obtain a polymer solution containing an ion-exchange group. The polymer solution was added in 2000 g of 6 mol/L hydrochloric acid, and the mixture was stirred for 1 hour. A crude polymer precipitated was filtered, washed with a large amount of a mixed solution of hydrochloric acid and methanol several times, and washed with a large amount of acetonitrile to remove hydrochloric acid, and then dried under reduced pressure to obtain 14.2 g of a polymer 3 containing an ion-exchange group, the polymer 3 having a structural unit represented by the following formula:

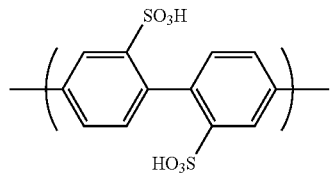

and a structural unit represented by the following formula:

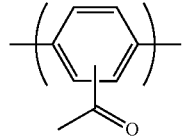

Example 1

To 200 g of the aromatic emulsion (including 198.74 g of water) obtained in Synthesis Example was added 3.45 g of cesium carbonate, and the mixture was stirred at room temperature for a whole day and night to obtain a resin composition 1 for a carbon dioxide gas separation membrane.

Example 2

To 201 g of the aromatic emulsion (including 199.9 g of water) obtained in Synthesis Example were added 4.425 g of cesium carbonate and 143.1 g of water, and the mixture was stirred at room temperature for a whole day and night to obtain a resin composition 2 for a carbon dioxide gas separation membrane.

Example 3

To 2032 g of the aromatic emulsion (including 2028.6 g of water) obtained in Synthesis Example 3 was added 8.06 g of cesium carbonate, and the mixture was stirred at room temperature for a whole day and night to obtain a resin composition 3 for a carbon dioxide gas separation membrane.

Example 4

The resin composition for a carbon dioxide gas separation membrane, which was obtained in Example 1, was applied onto a surface of a hydrophilic PTFE porous membrane (manufactured by SUMITOMO ELECTRIC FINE POLYMER, INC., WPW-045-80, thickness: 80 μm, pore size: 0.45 μm). Next, the hydrophilic PTFE porous membrane after application of the resin composition was dried at 90° C. for 1 hour, and then thermally crosslinked at 120° C. for about 2 hours to obtain a carbon dioxide gas separation membrane 1. The thickness of the dried resin composition layer was 45 μm.

Example 5

The resin composition for a carbon dioxide gas separation membrane, which was obtained in Example 2, was deposited in the same manner as in Example 4 to obtain a carbon dioxide gas separation membrane 2. The thickness of the dried resin composition layer was 28 μm.

Example 6

The resin composition for a carbon dioxide gas separation membrane, which was obtained in Example 3, was deposited in the same manner as in Example 4 to obtain a carbon dioxide gas separation membrane 3. The thickness of the dried resin composition layer was 28 μm.

Example 7

The results of measuring the carbon dioxide permeance [mol/m²/sec/kPa] and the selectivity [–] for carbon dioxide gas separation membranes 1 to 3 are shown in Table 3. In the condition 1, the cell temperature was set to 80° C., and the bubbler temperature was set to 70° C. In the condition 2, the cell temperature was set to 70° C., and the bubbler temperature was set to 60° C. The selectivity was measured under the condition 1.

TABLE 3

|  | Carbon dioxide gas separation membrane 1 | Carbon dioxide gas separation membrane 2 | Carbon dioxide gas separation membrane 3 |
| --- | --- | --- | --- |
| Condition 1 Carbon dioxide permeance [mol/m²/sec/kPa] | $5.3 \times 10^{-6}$ | $5.7 \times 10^{-6}$ | $5.8 \times 10^{-6}$ |
| Condition 2 Carbon dioxide permeance [mol/m²/sec/kPa] | $3.8 \times 10^{-6}$ | $3.5 \times 10^{-6}$ | $4.5 \times 10^{-6}$ |
| Selectivity [—] | 309 | 280 | 232 |

Example 8

The results of measuring the water absorption ratio for carbon dioxide gas separation membranes 1 to 3 are shown in Table 4. From the results, it is considered that carbon dioxide gas separation membranes 1, 2 and 3 have proper mechanical strength even under a high humidity because they have a low water absorption ratio even under a high humidity.

TABLE 4

| Relative humidity | Carbon dioxide gas separation membrane 1 | Carbon dioxide gas separation membrane 2 | Carbon dioxide gas separation membrane 3 |
| --- | --- | --- | --- |
| 50% RH | 0.4 | 0.5 | 0.6 |
| 80% RH | 1.0 | 1.1 | 1.3 |

The result of measuring the amount of a fluidized gel for carbon dioxide gas separation membrane 1 is shown in Table 5. The result shows that carbon dioxide gas separation membrane 1 has high heat resistance.

TABLE 5

| | Carbon dioxide gas separation membrane 1 |
| --- | --- |
| Amount of a fluidized gel (mg/cm$^2$) | 0 |

INDUSTRIAL APPLICABILITY

Use of the resin composition of the present invention enables production of a carbon dioxide gas separation membrane excellent in carbon dioxide gas permeance and durability.

The invention claimed is:

1. A resin composition comprising: a substance capable of reacting reversibly with a carbon dioxide gas; and a hydrocarbon-based polymer containing a structural unit represented by the following formula (I):

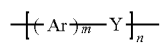

wherein Ar represents an arylene group forming a main chain; the arylene group has at least one directly or indirectly bonded ion-exchange group, and optionally has at least one group selected from the group consisting of a fluorine atom, an alkyl group having 1 to 20 carbon atoms and optionally having a substituent group, an alkoxy group having 1 to 20 carbon atoms and optionally having a substituent group, an aryl group having 6 to 20 carbon atoms and optionally having a substituent group, an aryloxy group having 6 to 20 carbon atoms and optionally having a substituent group, an acyl group having 2 to 20 carbon atoms and optionally having a substituent group, an arylsulfonyl group having 6 to 20 carbon atoms and optionally having a substituent group, an alkylsulfonyl group having 1 to 20 carbon atoms and optionally having a substituent group, and a cyano group; m represents an integer greater than or equal to 1; n represents an integer greater than or equal to 2; a plurality of occurrences of Ar is the same, or different; and Y represents a direct bond; and wherein:

the alkyl group having 1 to 20 carbon atoms and optionally having a substituent group is an alkyl group having 1 to 20 carbon atoms; or an alkyl group having a substituent group and having less than or equal to 20 carbon atoms in total;

the alkoxy group having 1 to 20 carbon atoms and optionally having a substituent group is an alkoxy group having 1 to 20 carbon atoms; or an alkoxy group having one or more substituent groups and having less than or equal to 20 carbon atoms in total;

the aryl group having 6 to 20 carbon atoms and optionally having a substituent group is an aryl group having 6 to 20 carbon atoms; or an aryl group having one or more substituent groups and having less than or equal to 20 carbon atoms in total;

the aryloxy group having 6 to 20 carbon atoms and optionally having a substituent group is an aryloxy group having 6 to 20 carbon atoms; or an aryloxy group having one or more substituent groups and having less than or equal to 20 carbon atoms in total;

the acyl group having 2 to 20 carbon atoms and optionally having a substituent group is an acyl having 2 to 20 carbon atoms; or an acyl group having one or more substituent groups and having less than or equal to 20 carbon atoms in total;

the arylsulfonyl group having 6 to 20 carbon atoms and optionally having a substituent group is an arylsulfonyl group having 6 to 20 carbon atoms; or an arylsulfonyl group having one or more substituent groups and having less than or equal to 20 carbon atoms in total; and the alkylsulfonyl group having 1 to 20 carbon atoms and optionally having a substituent group is alkylsulfonyl group having 1 to 20 carbon atoms; or an alkylsulfonyl group having one or more substituent groups and having less than or equal to 20 carbon atoms in total.

2. The resin composition according to claim 1, wherein the substance capable of reacting reversibly with a carbon dioxide gas is an alkali metal carbonate, an alkali metal hydrogen carbonate or an alkali metal hydroxide.

3. The resin composition according to claim 1, wherein the substance capable of reacting reversibly with a carbon dioxide gas is an alkali metal carbonate or an alkali metal hydrogen carbonate.

4. The resin composition according to claim 1, wherein the substance capable of reacting reversibly with a carbon dioxide gas is cesium carbonate, cesium hydrogen carbonate, rubidium carbonate or rubidium hydrogen carbonate.

5. The resin composition according to claim 1, wherein the substance capable of reacting reversibly with a carbon dioxide gas is cesium carbonate.

6. The resin composition according to claim 1, wherein the content of the substance capable of reacting reversibly with a carbon dioxide gas is in the range of 20% by weight to 90% by weight based on the total weight of the substance capable of reacting reversibly with a carbon dioxide gas and the hydrocarbon-based polymer containing a structural unit represented by said formula (I).

7. A carbon dioxide gas separation membrane comprising the resin composition according to claim 1, and a porous membrane.

8. The resin composition according to claim 1, wherein the hydrocarbon-based polymer further contains a structural unit represented by formula (I), wherein Y represents $SO_2$, CO or O, and a plurality of occurrences of Y is the same, or different.

* * * * *